US008649333B2

(12) United States Patent
Fukuoka et al.

(10) Patent No.: US 8,649,333 B2
(45) Date of Patent: *Feb. 11, 2014

(54) RADIO COMMUNICATION SYSTEM, RADIO TRANSMISSION APPARATUS, AND RESOURCE ALLOCATION METHOD

(75) Inventors: Masaru Fukuoka, Ishikawa (JP); Akihiko Nishio, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1493 days.

This patent is subject to a terminal disclaimer.

(21) Appl. No.: 12/293,522

(22) PCT Filed: Mar. 20, 2007

(86) PCT No.: PCT/JP2007/055683
§ 371 (c)(1),
(2), (4) Date: Sep. 18, 2008

(87) PCT Pub. No.: WO2007/119452
PCT Pub. Date: Oct. 25, 2007

(65) Prior Publication Data
US 2009/0245188 A1 Oct. 1, 2009

(30) Foreign Application Priority Data
Mar. 20, 2006 (JP) ................................. 2006-076610

(51) Int. Cl.
*G01R 31/08* (2006.01)
(52) U.S. Cl.
USPC ............................ 370/329; 370/468; 370/203

(58) Field of Classification Search
USPC ................... 370/329–339, 35–238, 344, 431, 370/458–461
See application file for complete search history.

(56) References Cited

U.S. PATENT DOCUMENTS

| | | | |
|---|---|---|---|
| 7,519,018 B2 * | 4/2009 | Kwak | 370/320 |
| 7,916,623 B2 * | 3/2011 | Kim et al. | 370/208 |
| 2006/0039318 A1 * | 2/2006 | Oh et al. | 370/328 |
| 2007/0171864 A1 * | 7/2007 | Zhang et al. | 370/329 |
| 2009/0316632 A1 * | 12/2009 | Prakash | 370/329 |

OTHER PUBLICATIONS

3GPP TSG-RAN WG1 Meeting #42 ,Tdoc R1-050884 , London, UK, Aug. 29-Sep. 2, 2005.*
3GPP TSG-RAN WG2 Meeting#42—Physical Channel Structure and Procedure for EUTRAN downlink Aug. 29-Sep. 2, 2005.*
International Search Report dated Jun. 19, 2007.

(Continued)

*Primary Examiner* — Ricky Ngo
*Assistant Examiner* — Iqbal Zaidi
(74) *Attorney, Agent, or Firm* — Dickinson Wright PLLC

(57) ABSTRACT

Provided is a resource allocation method capable of improving a reception quality when connecting a plurality of sub frames into one frame and performing a communication process for each of the frames. In this method, when a sub frame #1 is transmitted, LRB is selected as a resource allocation format according to CQI fed back from a mobile station and RB having a preferable propagation quality is allocated for transmission data according to the LRB format. When a sub frame #2 is transmitted, the same resource allocation method (LRB) as the head sub frame is used and the transmission data is allocated for the same RB. When a sub frame #3 is transmitted, the resource allocation method is switched from the sub frame #1 and the sub frame #2 and the transmission data is allocated for RB by using the DRB format.

9 Claims, 18 Drawing Sheets

(56) References Cited

OTHER PUBLICATIONS

3GPP RAN WG1 #42 meeting (Aug. 2005) R1-050884, "Physical Channel Structure and Procedure for EUTRA Downlink,".

3GPP RAN WG1 #41 meeting (Mar. 2005) R1-050464, NTT DoCoMo, "Physical Channel Structure for Evolved UTRA.".

3GPP TSG-RAN WG1 LTE Ad Hoc Meeting, Jan. 2006, R1-060038, NTT DoCoMo, Mitsubishi Electric Corporation, NEC, Sharp, "Distributed OFDMA Transmission for Shared Data Channel in E-UTRA Downlink."

3GPP RAN WG1 LTE ad hoc meeting, Jan. 2006, R1-060126, Samsung, "Text proposal on downlink channelization."

3GPP TSG RAN WG1#44, Feb. 2006, R1-060716, Motorola, Ericsson, "Variable TTI for LTE TP."

3GPP TSG RAN WG1#44, Feb. 2006, R1-060716 Motorola, Ericsson, "Variable TTI for LTE TP."

\* cited by examiner

| ALLOCATION RESOURCE CONTROL SIGNAL | RESOURCE ALLOCATION SCHEME OF EACH SUBFRAME NUMBER | | |
|---|---|---|---|
| | 1 | 2 | 3 |
| 0 | LRB | LRB | LRB |
| 1 | LRB | LRB | DRB |
| 2 | LRB | DRB | DRB |
| 3 | DRB | DRB | DRB |

FIG.3

RADIO COMMUNICATION SYSTEM, RADIO TRANSMISSION APPARATUS, AND RESOURCE ALLOCATION METHOD

TECHNICAL FIELD

The present invention relates to a radio communication system, radio transmitting apparatus and resource allocation method.

BACKGROUND ART

With increased Internet traffic of recent years, there is an increasing demand for high-speed packet transmission techniques in mobile communication, and an OFDM (Orthogonal Frequency Division Multiplex) scheme is studied as one of the transmission schemes that realize high-speed packet transmission. The OFDM scheme can reduce degradation of performances due to multipath interference by transmitting data streams in parallel using a plurality of subcarriers and providing CP's (Cyclic Prefixes), and is robust against frequency selective fading by adopting error correcting coding.

It is studied to use resource allocation schemes such as an LRB (Localized Resource Block) and DRB (Distributed Resource Block) resource allocation scheme when this OFDM is applied in downlink and data for a plurality of mobile stations is frequency-multiplexed on a plurality of subcarriers (for example, see Non-Patent Document 1).

With the LRB scheme, the base station performs the frequency scheduling to which subcarriers are allocated adaptively, based on the received quality of each frequency band in the mobile stations, so that it is possible to maximize the multiuser diversity effect and perform communication efficiently. Frequency scheduling is normally performed per resource block (RB) which puts together several neighboring subcarriers located approximately coherent frequency band adjacent to each other, into a block. Therefore, little frequency diversity effect is provided.

By contrast with this, the DRB scheme allocates transmission data for the mobile stations in a distributed manner over the entire band of subcarriers, so that it is possible to provide a high frequency diversity effect. Further, the DRB scheme allocates transmission data regardless of the received quality of each mobile station and therefore cannot provide the frequency scheduling effect and the multiuser diversity effect as in the LRB scheme.

Meanwhile, a technique called TTI (Transmission Time Interval) concatenation is studied recently. TTI concatenation is a technique of connecting a plurality of subframes and treating them as one TTI. Therefore, for example, control information common to the plurality of subframes is added to the head of the TTI after connection. In this way, with TTI concatenation, only one control information is reported for a plurality of subframes, so that it is possible to reduce an overhead required for control information of the subsequent subframe. In Non-Patent Document 2, this TTI concatenation is referred to as "long TTI" or "adaptive TTI."

Non-Patent Document 1: "Physical Channel Structure and Procedure for EUTRA Downlink," 3GPP RAN WG1 #42 meeting (2005.8) R1-050884

Non-Patent Document 2: "Physical Channel Structure for Evolved UTRA," 3GPP RAN WG1 #41 meeting (2005.3) R1-050464

DISCLOSURE OF INVENTION

Problems to be Solved by the Invention

A case will be examined where TTI concatenation is applied when an LRB scheme is used as a resource allocation scheme. FIG. 1 illustrates problems caused in this case.

The base station performs frequency scheduling upon transmission of head subframe #1 based on the received quality of each RB which is fed back from a mobile station, and allocates transmission data to frequency resources based on the LRB scheme. At this time, control information required for decoding is reported using an SCCH (shared control channel). Further, in subframe #2, transmission data is allocated to the same frequency resources using the same LRB scheme as in subframe #1 and transmitted. In the same way, also in subframe #3, transmission data is allocated to the same frequency resources using the same LRB scheme as in subframe #1 and transmitted.

However, with later subframes, the channel environment may fluctuate by move of the mobile station or changes in the environment around the mobile station. In this case, differences occur between the received quality of each RB fed back earlier from the mobile station, and the actual (real-time) received quality of subframe #3. Therefore, if frequency allocation is performed in subframe #3 based on the received quality reported earlier, the reception performances of subframe #3 degrade substantially.

It is therefore an object of the present invention to provide a radio communication system, radio transmitting apparatus and resource allocation method that can improve received quality when a plurality of subframes are connected to make a TTI and communication processing is performed per TTI, as in TTI concatenation.

Means for Solving the Problem

The radio communication system of the present invention where a connection subframe connecting a plurality of subframes is used as one unit in communication processing, includes: a selecting section that selects a localized resource block scheme or a distributed resource block scheme as a resource allocation scheme; and an allocating section that allocates data in the connection subframe to frequency resources per subframe according to the selected resource allocation scheme, and in the radio communication system, the selecting section switches the resource allocation scheme from the localized resource block scheme to the distributed resource block scheme in the connection subframe.

Here, the selecting section may be mounted on either the radio transmitting apparatus or the radio receiving apparatus in the radio communication system.

Further, the connection subframe is, for example, a TTI after connection in the TTI concatenation technique.

Advantageous Effect of the Invention

According to the present invention, when a plurality of subframes are connected to make a TTI and communication processing is performed per TTI as in TTI concatenation, received quality can be improved.

BRIEF DESCRIPTION OF DRAWINGS

FIG. 3 shows an example of the table inside an allocation resource table determining section according to Embodiment 1;

BEST MODE FOR CARRYING OUT THE INVENTION

Figure 1:
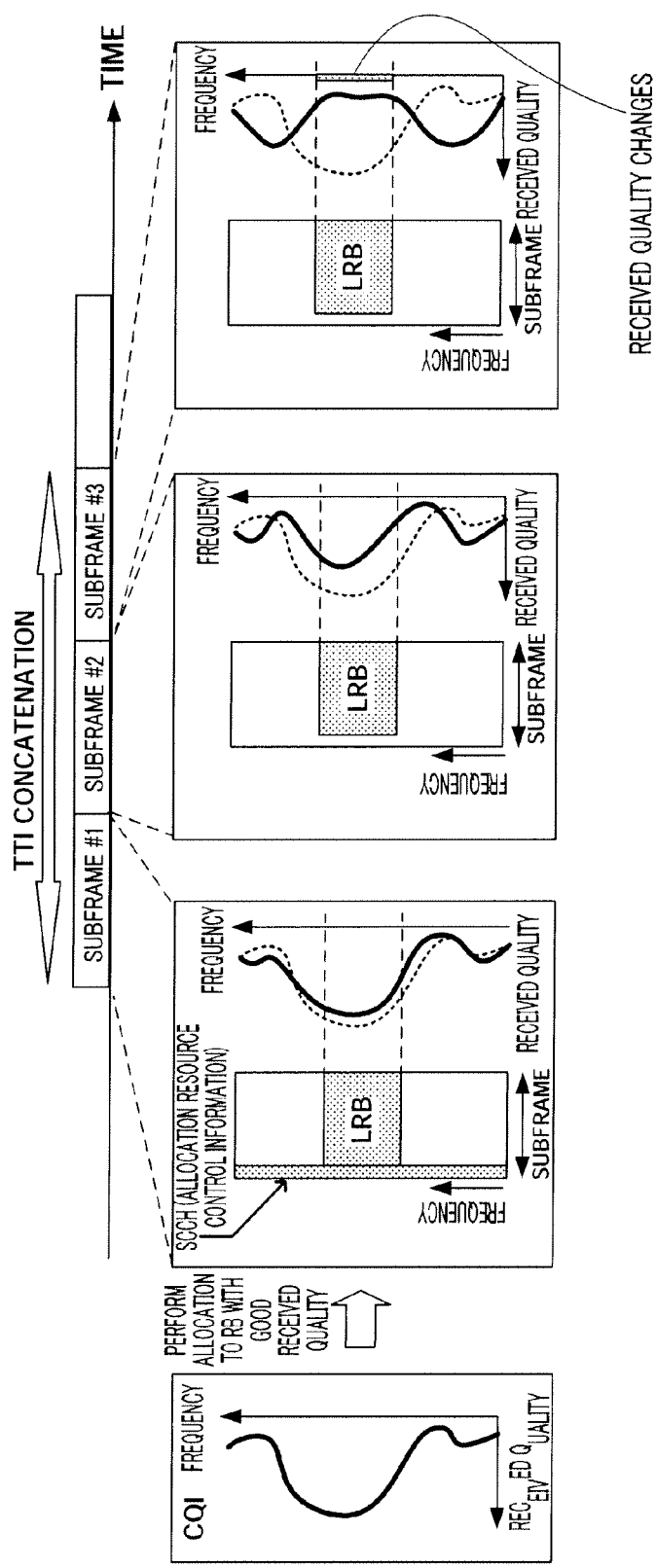
FIG. 1 illustrates the problem.

Embodiments of the present invention will be described in detail below with reference to the accompanying drawings. In the present description, a plurality of components having the same functions will be assigned the same reference numerals, and different branch numbers are assigned after the reference numerals to distinguish between the components.

Embodiment 1

Figure 2:
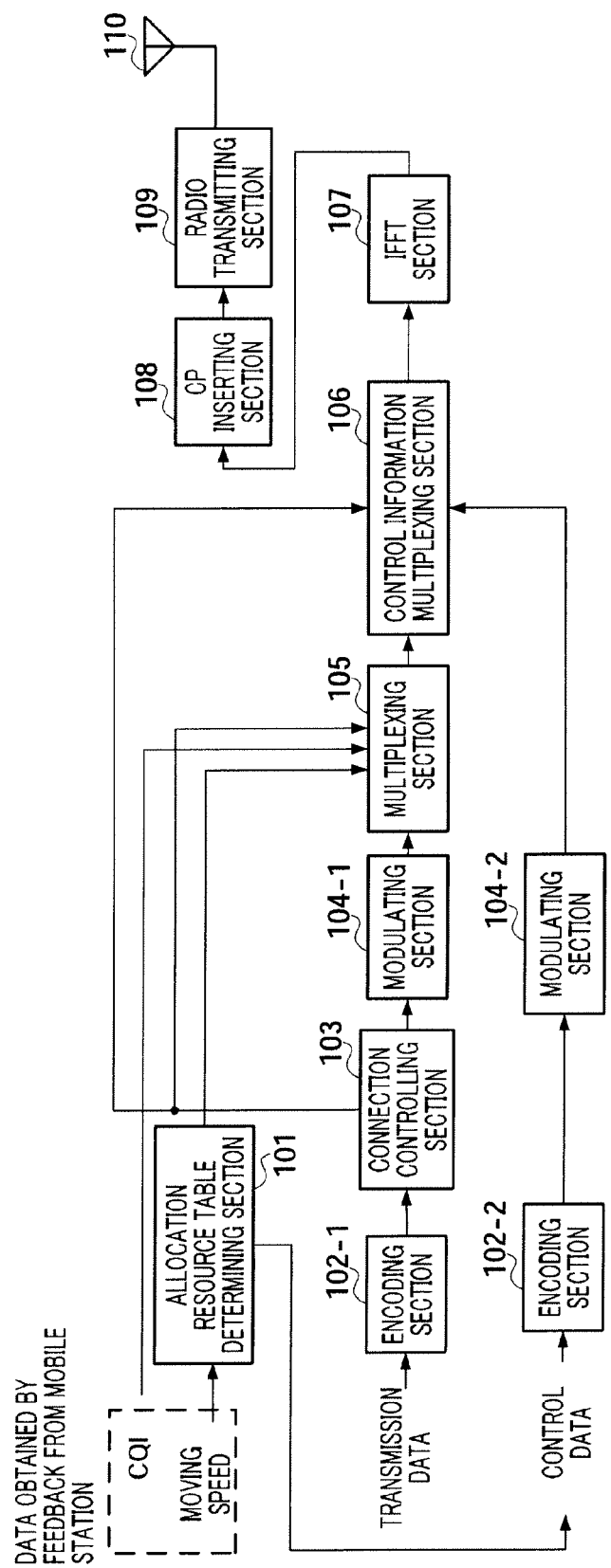
FIG. 2 is a block diagram showing the main configuration of the radio transmitting apparatus according to Embodiment 1 of the present invention.

FIG. 2 is a block diagram showing the main configuration of the radio transmitting apparatus according to Embodiment 1 of the present invention. Here, a case will be described as an example where the radio transmitting apparatus is used as a base station in a mobile communication system.

The radio transmitting apparatus according to the present embodiment has allocation resource table determining section 101, encoding sections 102-1 and 102-2, connection controlling section 103, modulating sections 104-1 and 104-2, multiplexing section 105, control information multiplexing section 106, IFFT section 107, CP inserting section 108, radio transmitting section 109 and antenna 110, and these sections perform the following operations.

Encoding section 102-1 performs error correcting encoding such as turbo encoding on transmission data and outputs the result to connection controlling section 103. Encoding section 102-2 also performs error correcting encoding such as turbo encoding on control data and outputs the result to modulating section 104-2.

Connection controlling section 103 controls the number of subframes to connect. To be more specific, connection controlling section 103 transmits symbols which is to be multiplexed on a transmission subframe in the encoded data to modulating section 104-1. Further, connection controlling section 103 reports the subframe number to be transmitted next to multiplexing section 105 and control information multiplexing section 106.

Modulating section 104-1 performs predetermined modulating processing such as QPSK and 16QAM on a symbol which is outputted from connection controlling section 103 and which is to be multiplexed on a transmission subframe, and outputs the result to multiplexing section 105. Modulating section 104-2 performs modulation such as QPSK and 16QAM on encoded data outputted from encoding section 102-2 and outputs the result to control information multiplexing section 106.

Allocation resource table determining section 101 determines a resource allocation scheme based on moving speed information fed back from the mobile station with reference to a data table stored inside, and outputs an allocation resource control signal showing this scheme to multiplexing section 105 and encoding section 102-2. FIG. 3 shows an example of the above table inside allocation resource table determining section 101. This table determines the correspondence relationship between the resource allocation schemes (i.e., LRB scheme and DRB scheme) of each subframe (specifically, each subframe number) and allocation resource control signals. For example, when the resource allocation schemes of subframes #1, #2 and #3 are determined to be LRB, LRB and DRB, respectively, based on the moving speed, allocation resource table determining section 101 outputs allocation resource control signal #1 (see the hatching part in the figure).

Multiplexing section 105 allocates modulated data outputted from modulating section 104-1 to a plurality of frequency resources, performs frequency-domain-multiplexing on the transmission data and outputs the multiplexed signal to control information multiplexing section 106. Here, multiplexing section 105 uses the resource allocation scheme of each subframe specified by the allocation resource control signal. Particularly, when the resource allocation scheme is the LRB scheme, multiplexing section 105 allocates frequency resources based on CQI information fed back from the mobile station.

Control information multiplexing section 106 checks the subframe numbers, and, when a subframe is the head subframe, multiplexes predetermined control information and outputs the multiplexed signal to IFFT section 107.

IFFT section 107 performs inverse fast Fourier transform (IFFT) processing on the multiplexed signal to generate an OFDM symbol converted to the time domain and outputs the symbol to CP inserting section 108.

CP inserting section 108 duplicates the rear part of the OFDM symbol outputted from IFFT section 107 as a CP, inserts the CP to the head part and outputs the resulting signal to radio transmitting section 109.

Radio transmitting section 109 performs predetermined radio transmission processing such as D/A conversion and power amplification on the signal after the CP is inserted, generates a radio signal and transmits the signal via antenna 110.

Figure 4:
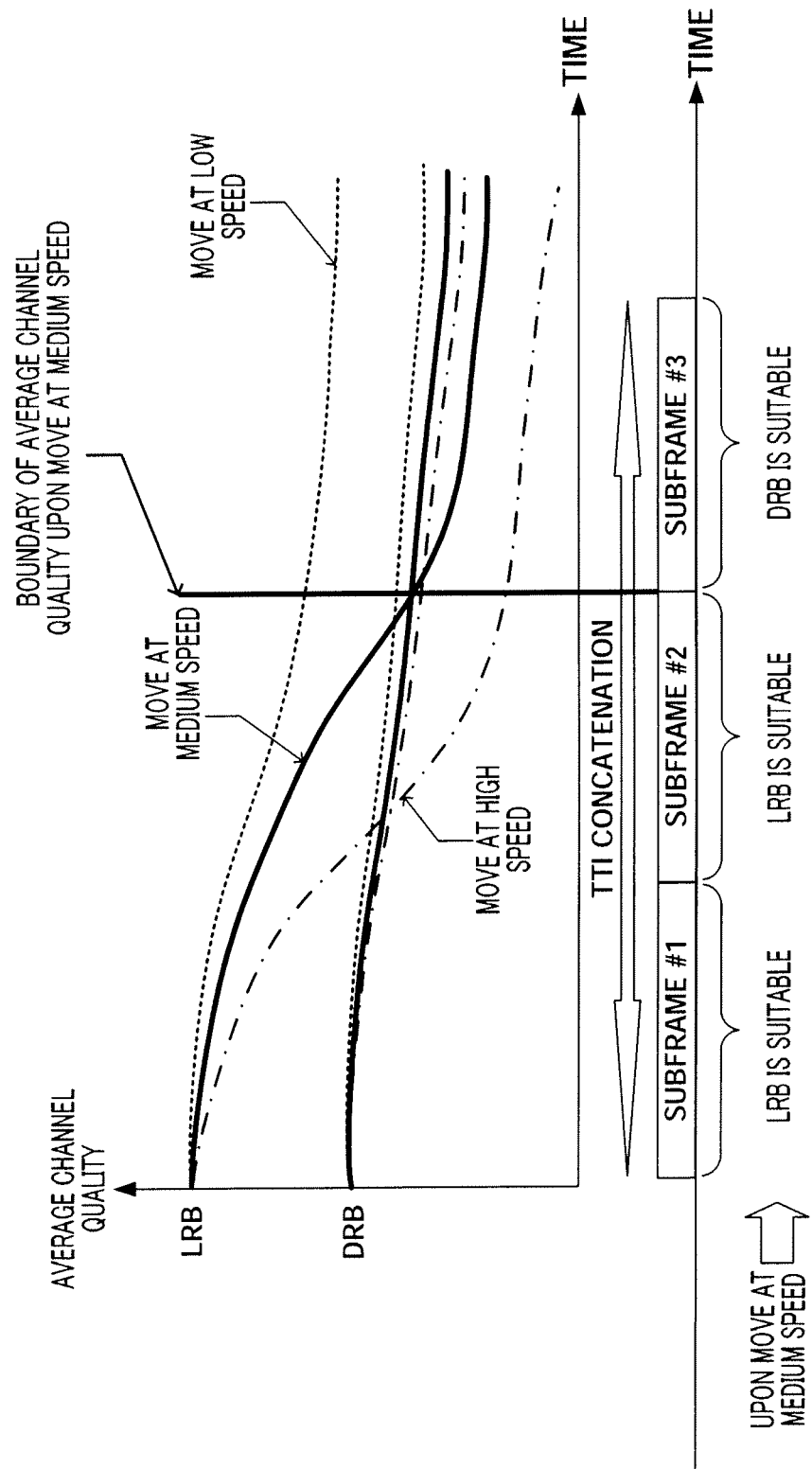
FIG. 4 illustrates the basic operation of the allocation resource table determining section according to Embodiment 1.

Next, the operation of allocation resource table determining section 101 will be described in more detail. FIG. 4 illustrates the basic operation of allocation resource table determining section 101.

Based on the moving speed fed back from the mobile station, the speed of channel fluctuation can be predicted. The graph in the figure shows the calculated average channel quality of each band when the LRB scheme or DRB scheme is used. Allocation resource table determining section 101 specifies, from this graph, the subframe where the average channel quality in the band of the DRB scheme is higher than the average channel quality in the band of the LRB scheme. That is, the position of the boundary where the frequency diversity effect exceeds the frequency scheduling effect, is calculated. FIG. 4 shows the boundary upon move at a medium speed. The subframe that follows the boundary in the time domain becomes the subframe in which the resource allocation scheme should be switched. Therefore, allocation resource table determining section 101 reports the number of this subframe (particularly referred to as "switching subframe number") and the allocation resource control signal determined based on the table shown in FIG. 3, to multiplexing section 105 and encoding section 102-2 as control information.

Figure 5:
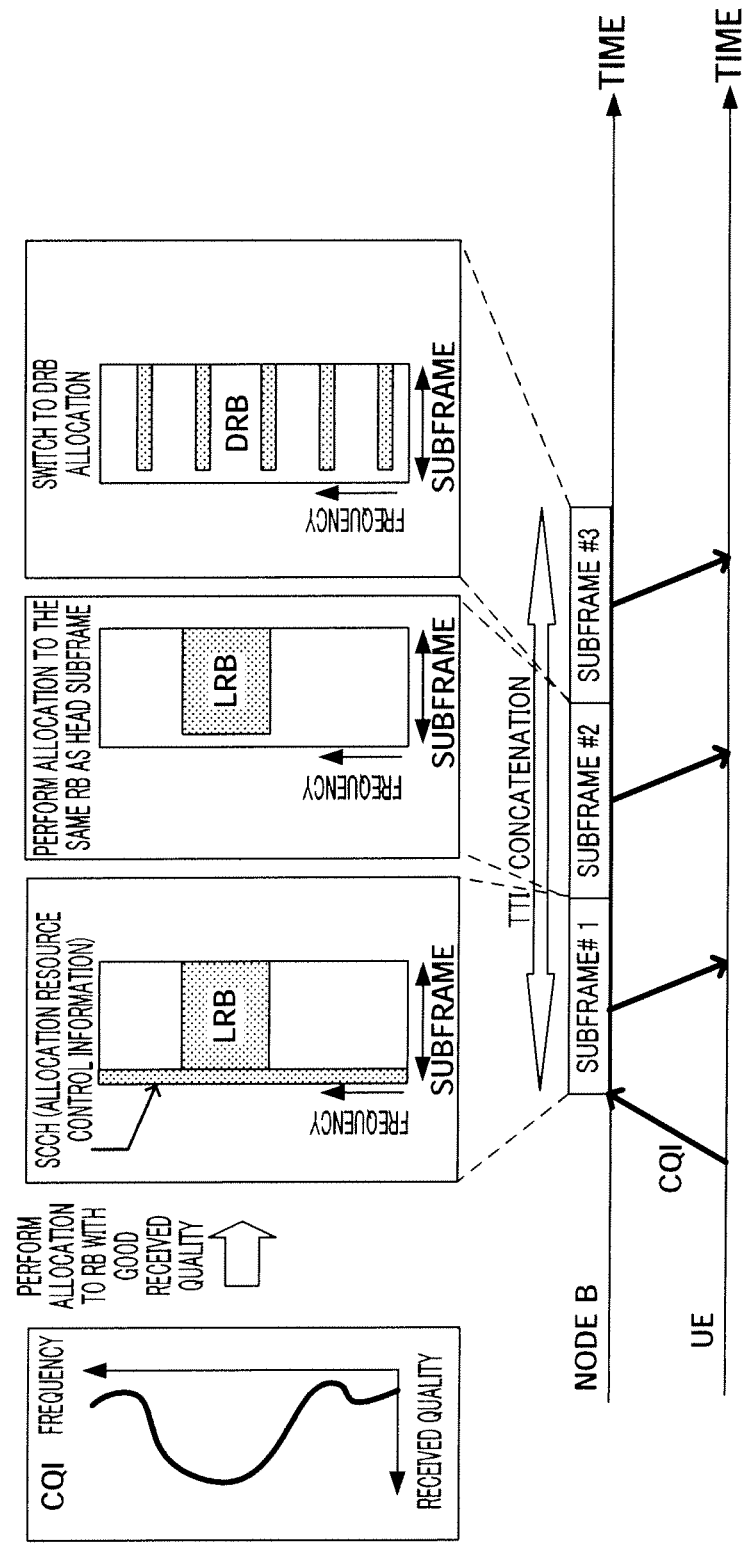
FIG. 5 illustrates a signal transmitted from the radio transmitting apparatus according to Embodiment 1.

FIG. 5 illustrates the signal transmitted by the above operation from the radio transmitting apparatus according to the present embodiment. Here, "1" is assumed to be selected as the allocation resource control signal.

Figure 6:
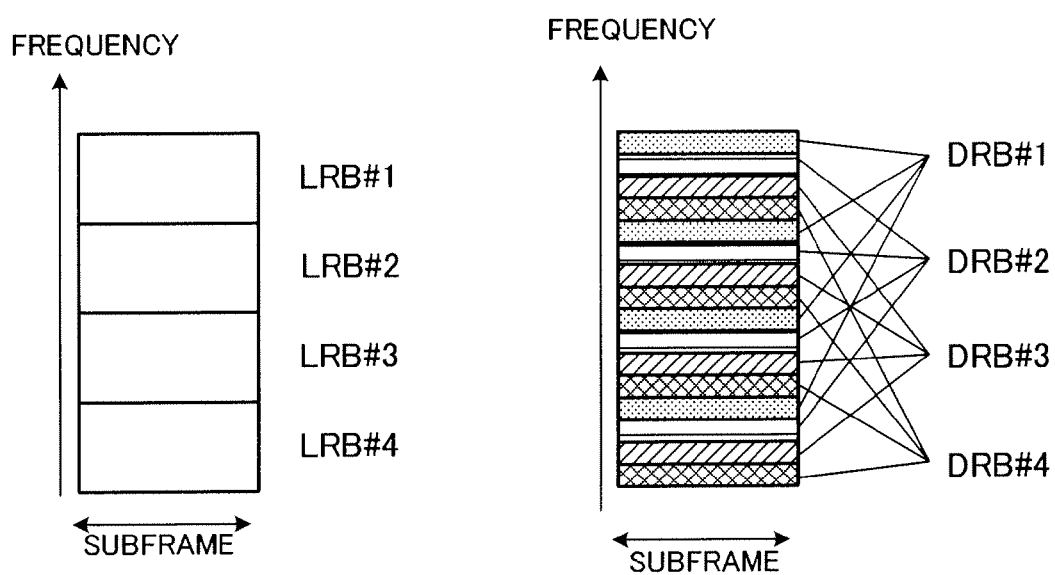
FIG. 6 illustrates LRB numbers and DRB numbers.

Upon transmission of head subframe #1, the LRB is selected as the resource allocation scheme based on the CQI fed back from the mobile station, and the RB with the best received quality is allocated to the transmission data according to the LRB scheme. Here, as the control information, the number of subframes to be subjected to TTI concatenation (three in the example of the figure), allocation resource control signal, LRB number and DRB number together with an MCS (Modulation and Coding Scheme) and coding rate, are multiplexed on a control channel SCCH and transmitted. As shown in FIG. 6, the LRB number and DRB number refer to the numbers for distinguishing between four resource allocation methods according to the resource allocation scheme, for example, LRB#1 to #4 when the resource allocation scheme is the LRB scheme, and, more specifically, show the position of the RB to which the transmission data is actually allocated.

Upon transmission of subframe #2, the allocation resource control signal shows "1," and therefore multiplexing section 105 allocates the transmission data to the same RB using the same resource allocation scheme (LRB) as the head subframe.

Upon transmission of subframe #3, the allocation resource control signal shows "1," and therefore multiplexing section 105 switches to a different resource allocation scheme from the head subframe and subframe #2, and allocates the transmission data to the RB using the DRB scheme.

In this way, the radio transmitting apparatus according to the present embodiment uses the LRB scheme as the resource allocation scheme in the first subframe in the TTI of transmission data, switches the resource allocation scheme to the DRB scheme from the intermediate subframe, and performs transmission. Further, the switching timing is changed adaptively based on the moving speed of the mobile station.

Next, the radio receiving apparatus (mobile station) according to the present embodiment matching the radio transmitting apparatus (base station) according to the above present embodiment will be described in detail.

Figure 7:
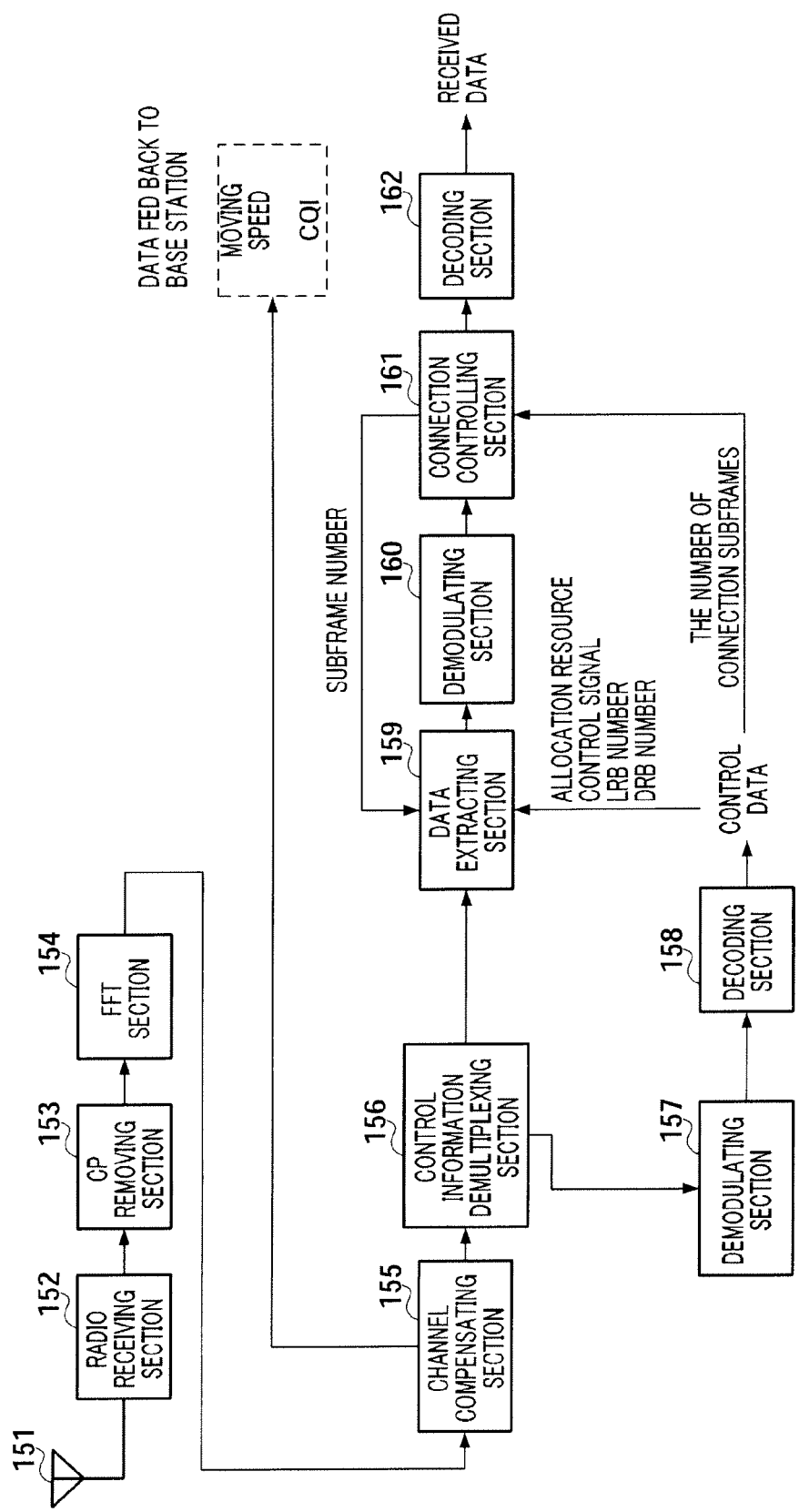
FIG. 7 is a block diagram showing the main configuration of the radio receiving apparatus according to Embodiment 1.

FIG. 7 is a block diagram showing the main configuration of the radio receiving apparatus according to the present embodiment.

The radio receiving apparatus according to the present embodiment has antenna 151, radio receiving section 152, CP removing section 153, FFT section 154, channel compensating section 155, control information demultiplexing section 156, demodulating section 157, decoding section 158, data extracting section 159, connection controlling section 161, and decoding section 162, and the sections perform the following operations.

Radio receiving section 152 performs predetermined radio receiving processing such as down-conversion and A/D conversion on a signal received via antenna 151 and outputs the obtained baseband signal to CP removing section 153.

CP removing section 153 removes the CP added to the received signal and outputs the signal after the CP is removed to FFT section 154.

FFT section 154 performs fast Fourier transform (FFT) processing on a per OFDM symbol basis, to convert the received signal to a frequency domain and outputs the frequency domain signal to channel compensating section 155.

Channel compensating section 155 performs channel estimation from the received pilot symbol of the frequency domain signal, compensates for the received signal using the obtained channel estimation value and outputs the compensated signal to control information demultiplexing section 156. Further, channel compensating section 155 measures the moving speed and CQI from the channel estimation value and outputs them separately.

Control information demultiplexing section 156 demultiplexes the symbols on which control information is multiplexed, from the compensated signal, outputs the symbols on which control information is mapped to demodulating section 157 and outputs the other symbols to data extracting section 159.

Demodulating section 157 performs predetermined demodulation processing such as QPSK and 16QAM on the symbols on which control information is mapped and outputs the demodulated signal to decoding section 158.

Decoding section 158 decodes the demodulated signal to obtain control data, outputs the allocation resource control signal, LRB number and DRB number to data extracting section 159, and outputs the number of connection subframes to connection controlling section 161.

Data extracting section 159 extracts a data symbol from the output signal of control information demultiplexing section 156 using the allocation resource control signal, LRB number, DRB number and subframe number and outputs the data symbol to demodulating section 160. Data extracting section 159 has the same table as the table (see FIG. 3) of allocation resource table determining section 101 in the radio transmitting apparatus.

Demodulating section 160 performs predetermined demodulating processing such as QPSK and 16QAM on the extracted data symbol, calculates the likelihood of each bit and outputs the demodulated signal to connection controlling section 161.

Connection controlling section 161 counts the number of received subframes outputted from demodulating section 160 and stores the data of each received subframe in an internal memory for a certain period. When the received data of subframes enough to perform TTI concatenation is obtained, a plurality of stored received subframes are connected, and data (TTI) after connection is transferred to decoding section 162 according to the number of connection subframes reported from decoding section 158.

Decoding section 162 decodes the data outputted from connection controlling section 161 and obtains the received data.

Figure 8:
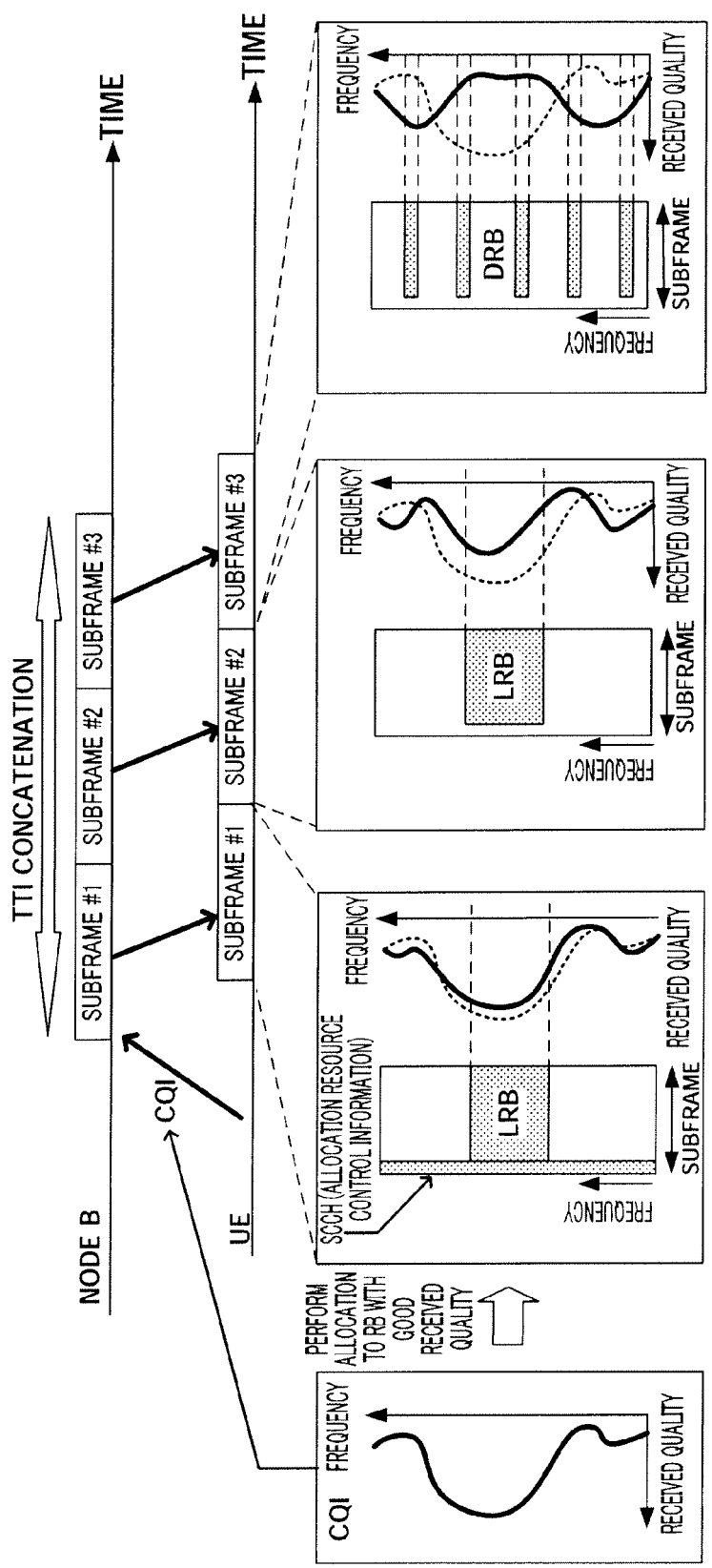
FIG. 8 illustrates reception processing and reception performance of the radio receiving apparatus according to Embodiment 1.

FIG. 8 illustrates reception processing and reception performance of the radio receiving apparatus according to the present embodiment having the above configuration. FIG. 8 assumes that "1" is selected as the allocation resource control signal.

Upon reception of subframe #1, first, by demodulating the control channel SCCH arranged in the head of subframe #1, control data is obtained. The allocation resource control signal, LRB number, DRB number and the number of connection subframes included in the control data is acquired and stored in the internal memory. Here, the allocation resource control signal shows "1," and so data extracting section 159 determines that the resource allocation scheme is the LRB based on the internal table (see FIG. 3). The RB to which data is actually allocated, is specified from the LRB number inputted separately, and a data symbol is extracted from this RB.

Upon reception of subframe #2, data extracting section 159 determines that the resource allocation scheme of this time is also the LRB from the allocation resource control signal showing "1," identifies the RB on which a data symbol is multiplexed, based on the LRB number inputted separately, and extracts the data symbol.

Upon reception of subframe #3, data extracting section 159 determines that the resource allocation scheme of this time is the DRB from the allocation resource control signal showing "1," identifies the RB on which a data symbol is multiplexed, based on the DRB number inputted separately, and extracts the data symbol.

As shown in FIG. 8, in subframe #3, the difference between the received quality reported in the CQI and the actual real-time received quality becomes large. However, with the present embodiment, in first subframes #1 and #2 in the TTI, the LRB scheme is used as the resource allocation scheme, and the DRB scheme is used from intermediate subframe #3, and therefore a frequency diversity gain can be provided in subframe #3, and received quality does not degrade substantially.

In this way, the radio receiving apparatus according to the present embodiment can improve reception performance by receiving a signal transmitted from the radio transmitting apparatus according to the present embodiment and performing the above operations.

As described above, according to the present embodiment, the radio transmitting apparatus performs TTI concatenation on the transmission signal and switches the resource allocation scheme from the LRB to the DRB in the intermediate subframe according to a predetermined rule. Therefore, it is possible to reduce control information by TTI concatenation, and, even if the channel environment fluctuates and frequency allocation performed using the head subframe as a reference becomes inadequate in the subsequent subframe, it is possible to provide a diversity effect by using the DRB scheme and prevent degradation of received quality. In other words, the present embodiment is characterized in that the resource allocation scheme is switched from the LRB to the DRB at a timing at which the frequency scheduling effect starts decreasing.

Further, according to the present embodiment, the resource allocation scheme switching timing (specifically, switching subframe number) is adjusted according to the moving speed of the mobile station. Therefore, even when the channel state fluctuates variously, it is possible to follow the fluctuations and prevent degradation of reception performance.

Figure 12:
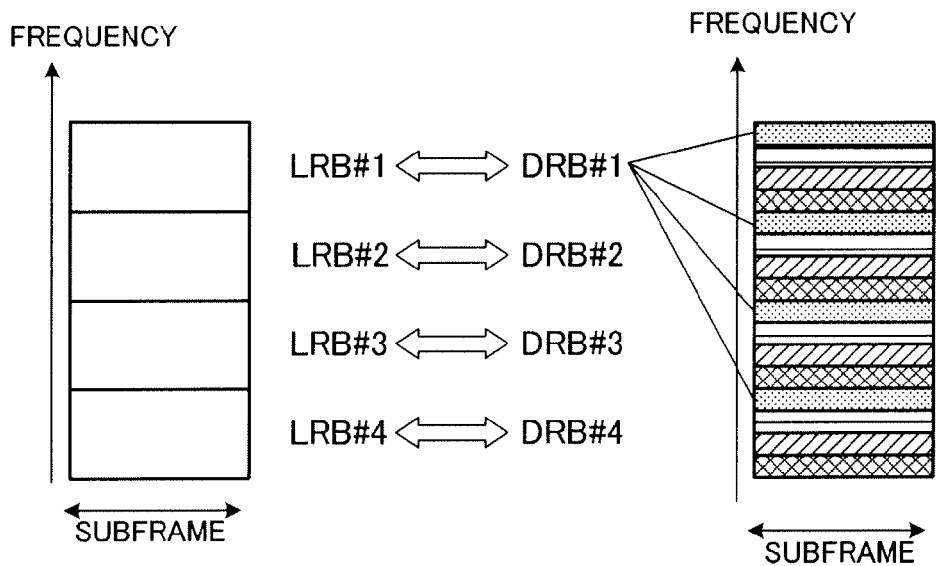
FIG. 12 shows an example of correspondence between the LRB numbers and the DRB numbers.

Further, although a configuration has been described as an example with the present embodiment where both the LRB number and DRB number are multiplexed on the SCCH and transmitted as control information upon transmission of the head subframe, it is also possible to adopt a configuration where the radio transmitting apparatus reports only the LRB number to the radio receiving apparatus by setting in advance the LRB numbers and DRB numbers in association with each other one-on-one. FIG. 12 shows an example of the correspondence between the LRB numbers and DRB numbers. By this means, the radio transmitting apparatus only has to report the LRB number and can reduce control information, and the radio receiving apparatus can recognize the DRB allocation number from the reported LRB number.

Further, a case has been described as an example with the present embodiment where the number of subframes to be subjected to TTI concatenation is three (the number of connection subframes is three) and the resource allocation scheme is switched in third subframe #3, and therefore there is only one subframe adopting the DRB scheme. However, for example, when the number of connection subframes is four or more, or the resource allocation scheme is switched in subframe #2, a plurality of subframes adopting the DRB scheme exist. In this case, the following resource allocation method of the DRB scheme can be adopted.

Figure 13:
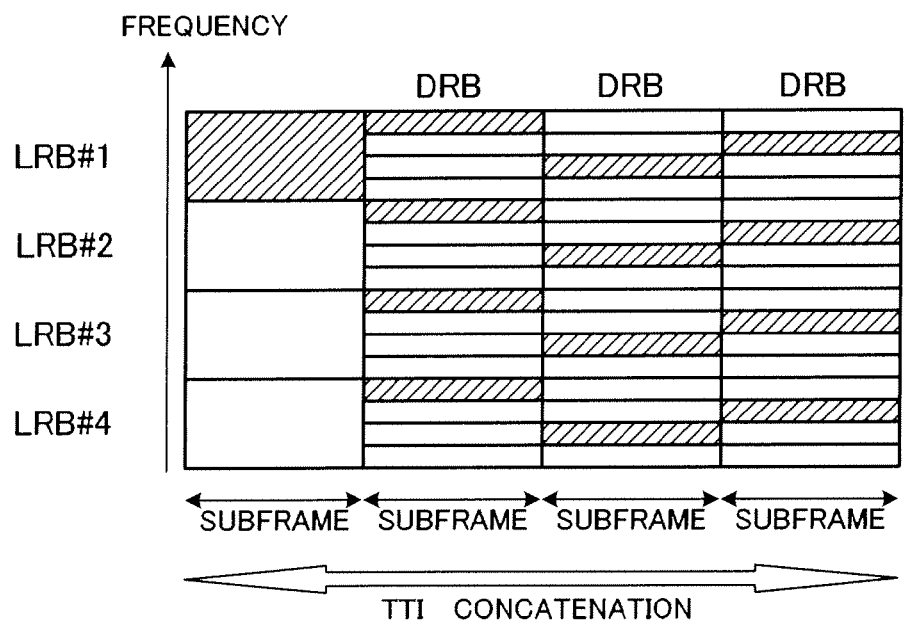
FIG. 13 shows an example of the resource allocation method of the DRB scheme.

FIG. 13 shows an example of the resource allocation method of the DRB scheme. In this way, the positions where frequency resources are allocated in the DRB scheme are changed per subframe. That is, the RB's of subsequent subframes are made different per subframe. By this means, it is possible to provide a higher frequency diversity effect.

Figure 14:
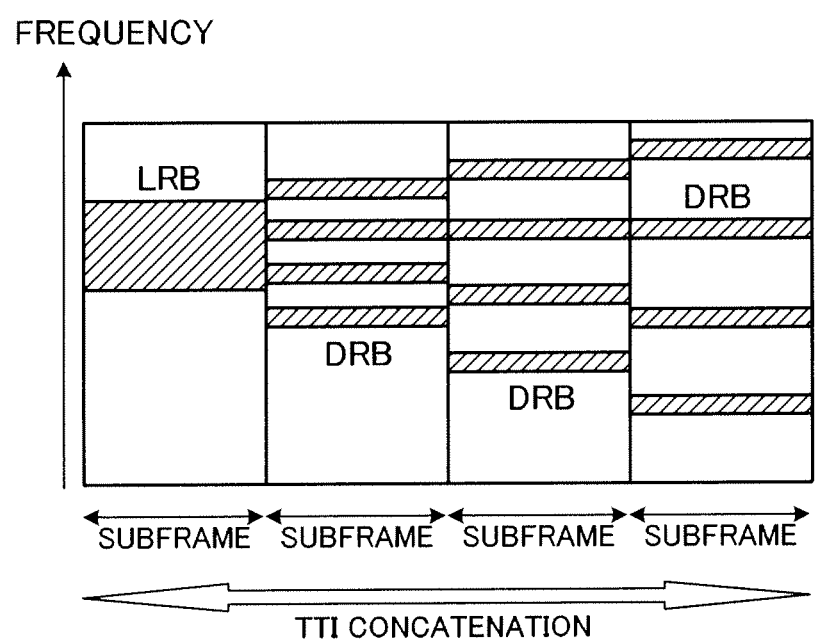
FIG. 14 shows another variation of the resource allocation method of the DRB scheme.

FIG. 14 shows another variation of the resource allocation method of the DRB scheme. Here, in the first subframe after the resource allocation scheme is switched to the DRB scheme, resources are allocated to the frequency positions in the range near the range for the LRB scheme. Further, with later subframes, frequency resources are distributed in a greater range in the DRB scheme. By this means, it is possible to shift from the LRB scheme to the DRB scheme gradually.

Figure 15:
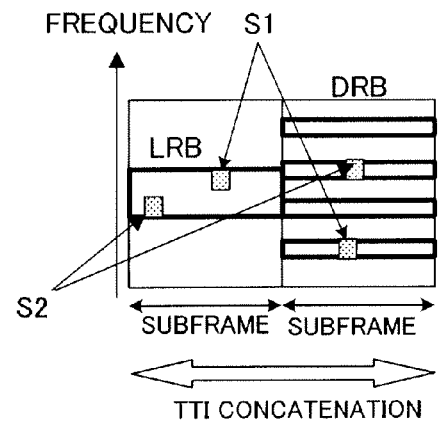
FIG. 15 shows an example of arrangement of repetition symbols.

Further, when repetition symbols are used with the present embodiment, a configuration may be adopted where some symbols are allocated to the subframes of the LRB scheme, and other symbols are allocated to the subframes of the DRB scheme. FIG. 15 shows an example of arrangement of repetition symbols. A configuration may also be adopted where at least one symbol is allocated to the subframe of the LRB scheme. By this means, even when a diversity gain cannot be provided due to the influence of frequency selective fading although two repetition symbols arranged in frequency resources of the DRB scheme are both subjected to symbol combining, at least one of the repetition symbols is arranged according to the LRB scheme, so that a certain level of received quality can be ensured.

Figure 16:
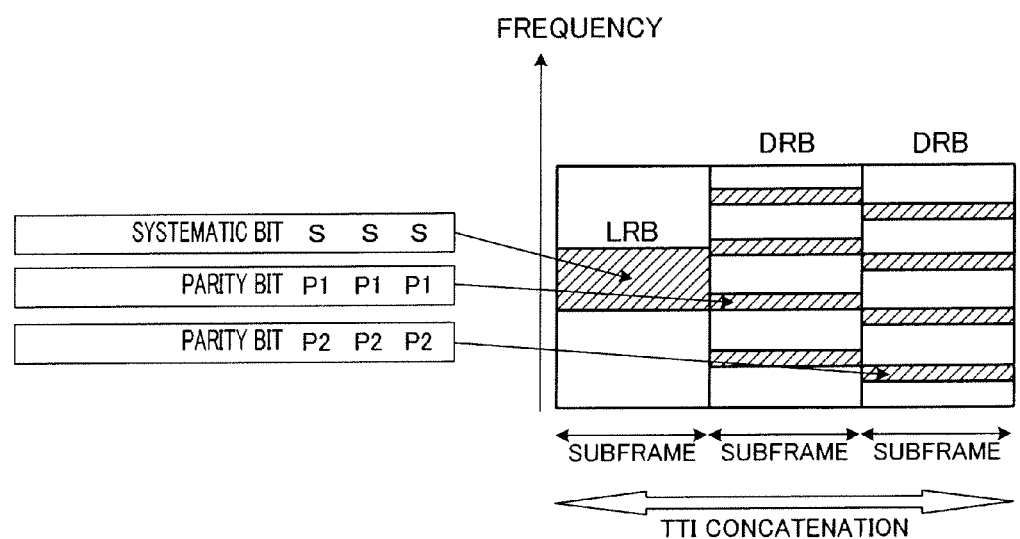
FIG. 16 shows an example of arrangement of turbo encoding bits.

Further, when turbo encoding is used with the present embodiment, a configuration where systematic bits are allocated to the subframes of the LRB scheme and parity bits are allocated to the subframes of the DRB scheme, or a configuration where systematic bits are allocated to the subframes of the LRB scheme preferentially, may be adopted. FIG. 16 shows an example of arrangement of turbo encoded bits. By this means, stable channel quality can be provided in systematic bits, so that it is possible to improve received performances after turbo decoding.

Further, although a configuration has been described as an example with the present embodiment where a common table is used between the transmission side and the reception side to switch the resource allocation scheme, it is also possible to adopt a configuration where the radio transmitting apparatus reports only the subframe number of the resource allocation scheme switching timing, as control information, to the radio receiving apparatus.

Further, although a configuration has been described as an example with the present embodiment where the number of the subframe in which switching is performed, is reported as a timing for switching the resource allocation scheme, it is also possible to report the ratio in the whole TTI (the number of the subframe at a switching timing)/(the number of connection subframes subjected to TTI concatenation), that is, report parameters showing the position of the switching timing in the whole TTI.

Further, although a configuration has been described as an example with the present embodiment where the resource allocation scheme switching timing is determined according to the moving speed of the mobile station, it is also possible to adopt a configuration where the resource allocation scheme switching timing is fixed from the design phase.

Embodiment 2

A case will be described as an example also with Embodiment 2 of the present invention where the radio transmitting apparatus according to the present embodiment is used as the base station in the mobile communication system.

A configuration has been described in Embodiment 1 where the base station switches the resource allocation scheme from the LRB to the DRB according to a predetermined table using a predetermined subframe according to the moving speed of the mobile station as the switching timing.

A configuration will be described with Embodiment 2 where the resource allocation scheme is fixed for the first predetermined period, then switching of the resource allocation scheme is adaptively determined based on various conditions, and the timing for starting the adaptive control and the resource allocation scheme of each subframe after the adaptive control, are reported appropriately.

Figure 9:
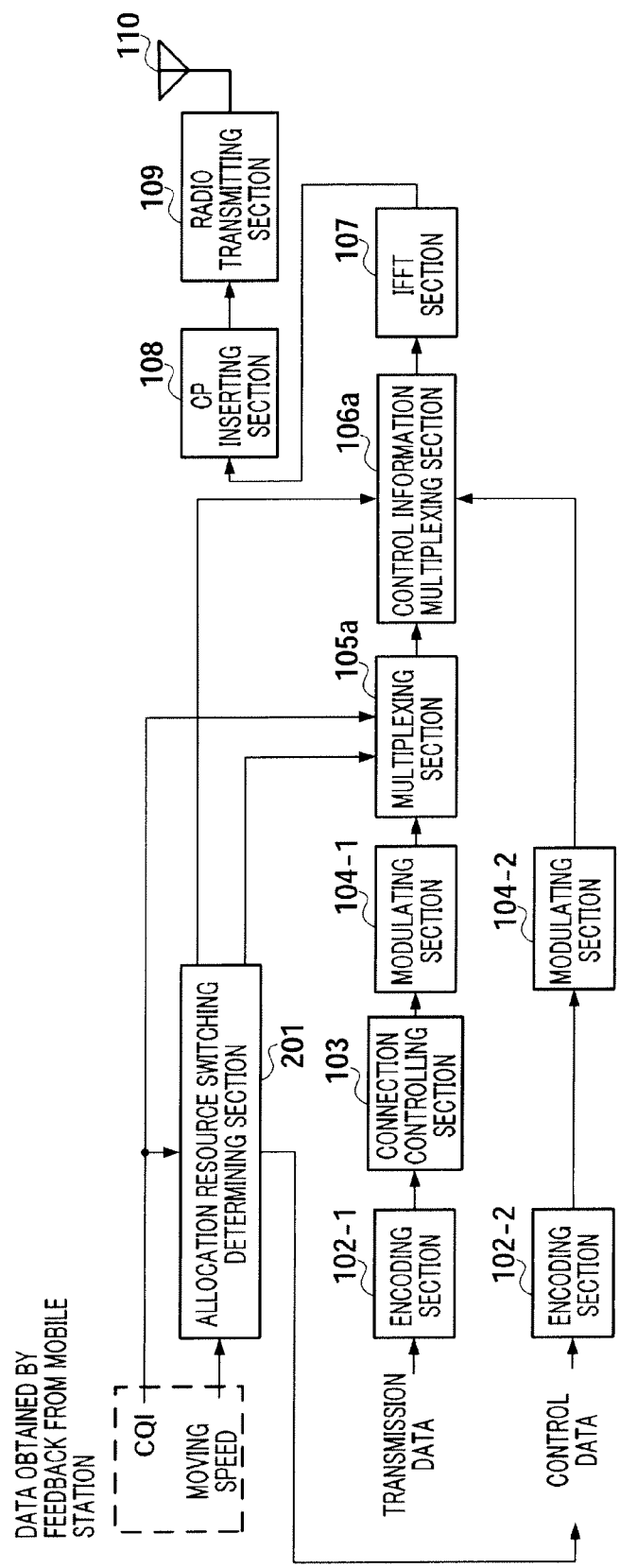
FIG. 9 is a block diagram showing the main configuration of the radio transmitting apparatus according to Embodiment 2.

FIG. 9 is a block diagram showing the main configuration of the radio transmitting apparatus according to the present embodiment. The radio transmitting apparatus has the basic configuration similar to the radio transmitting apparatus (see FIG. 2) described in Embodiment 1, and the same components will be assigned the same reference numerals without further explanations. Further, the components having the same basic operation, but a difference in detail, will be assigned reference numerals with lowercase characters after the same reference numerals to distinguish between the components. These components will be explained appropriately.

Allocation resource switching determining section 201 determines a timing for starting reallocation of frequency resources (reallocation start timing) based on the moving speed of the mobile station. To be more specific, to specify the reallocation start timing, the number of subframes from the head subframe to the subframe where reallocation is started (the number of reallocation subframes) is determined. This number of reallocation subframes is set small for the mobile station with a higher moving speed and set large for the mobile station with a lower moving speed. Further, allocation resource switching determining section 201 selects frequency resources to which transmission data is actually mapped according to the LRB scheme, based on CQI information fed back from the mobile station. The number of reallocation subframes and the resource allocation scheme of each subframe after the start of reallocation are outputted to multiplexing section 105a and control information multiplexing section 106a. Here, in the resource allocation scheme of each subframe after the start of reallocation, the received quality of the currently used RB is calculated based on the latest CQI fed back from the mobile station after the start of reallocation, and, when this received quality degrades, the resource allocation is switched from the LRB scheme to the DRB scheme.

Multiplexing section 105a allocates modulated data outputted from modulating section 104-1 to frequency resources and performs frequency-domain-multiplexing using the resource allocation scheme of each subframe specified in the allocation resource control signal outputted from allocation resource switching determining section 201, and outputs the obtained multiplexed signal to control information multiplexing section 106a. Particularly, after the start of reallocation, and, when the resource allocation scheme is the LRB scheme, multiplexing section 105a allocates frequency resources based on the CQI information each time fed back from the mobile station.

Control information multiplexing section 106a determines whether or not reallocation has been started based on the allocation resource control signal outputted from allocation resource switching determining section 201, and, if allocation has been started, control information multiplexing section 106a multiplexes predetermined control information per subframe and outputs the multiplexed signal to IFFT section 107.

Figure 10:
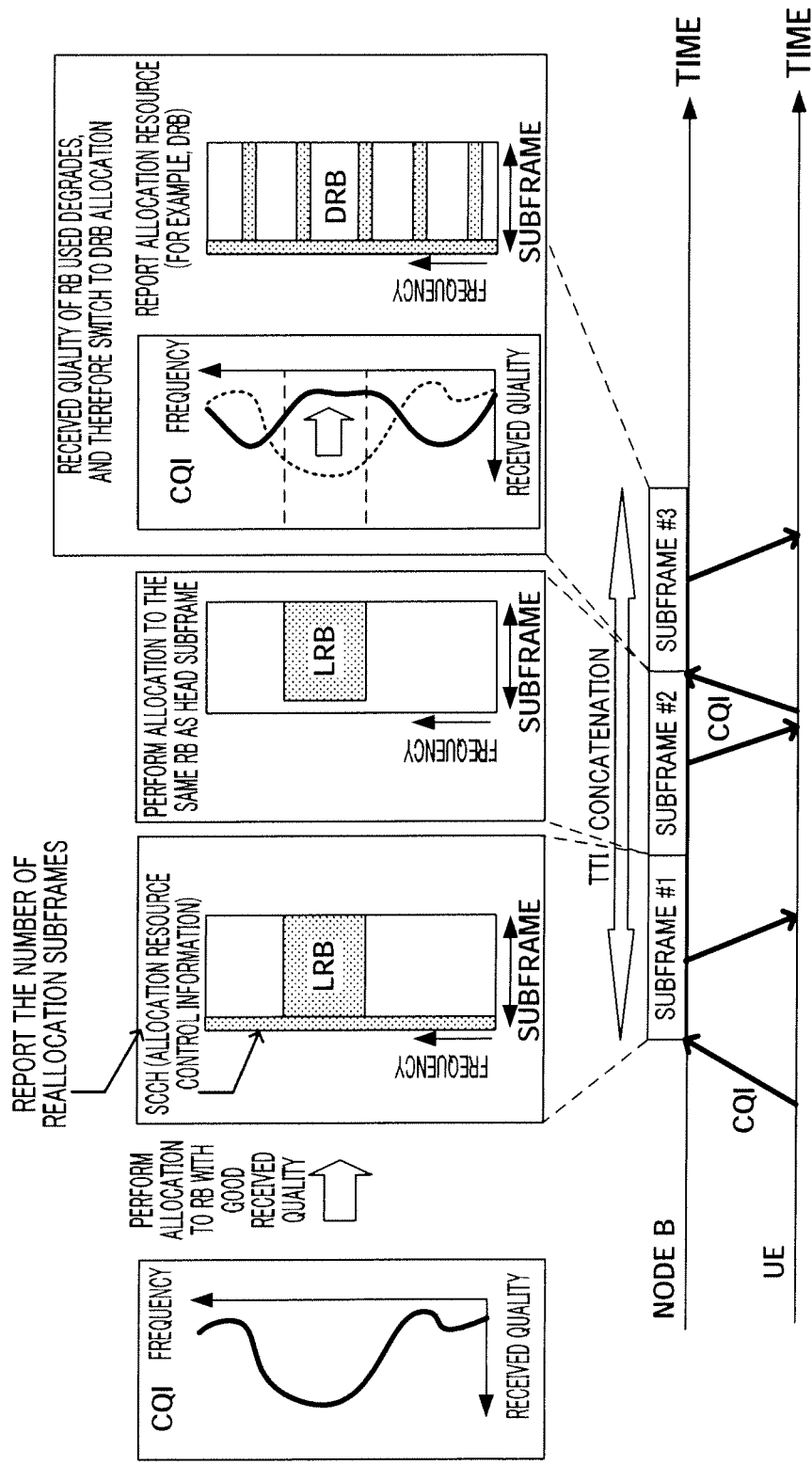
FIG. 10 illustrates a signal transmitted from the radio transmitting apparatus according to Embodiment 2.

FIG. 10 illustrates a signal transmitted from the radio transmitting apparatus according to the present embodiment.

In head subframe #1, according to the LRB scheme, transmission data is allocated to the band (frequency resource) with the best received quality based on the CQI fed back from the mobile station. Here, as the control information, the number of reallocation subframes (in this example, the number of reallocation subframes is "three") is multiplexed to the SCCH with an MCS and coding rate, and reported.

In subframe #2, the number of reallocation subframes is "three," and so frequency resources allocation is performed in the same band as in subframe #1 according to the LRB scheme.

In subframe #3, the number of reallocation subframes is "three," and so the received quality of the RB of the currently used allocation resource is calculated based on the latest CQI fed back from the mobile station. In this example, degradation of the received quality is found, and so the radio transmitting apparatus according to the present embodiment switches the resource allocation scheme from the LRB scheme to the DRB scheme. When degradation of the received quality is not found, the radio transmitting apparatus according to the present embodiment uses the LRB scheme as is as the resource allocation scheme for subframe #3.

Next, the radio receiving apparatus (mobile station) according to the present embodiment matching the radio transmitting apparatus (base station) according to the above present embodiment will be described. The configuration of the radio receiving apparatus according to the present embodiment is the same as that described in Embodiment 1, and so a block diagram will not be shown.

Figure 11:
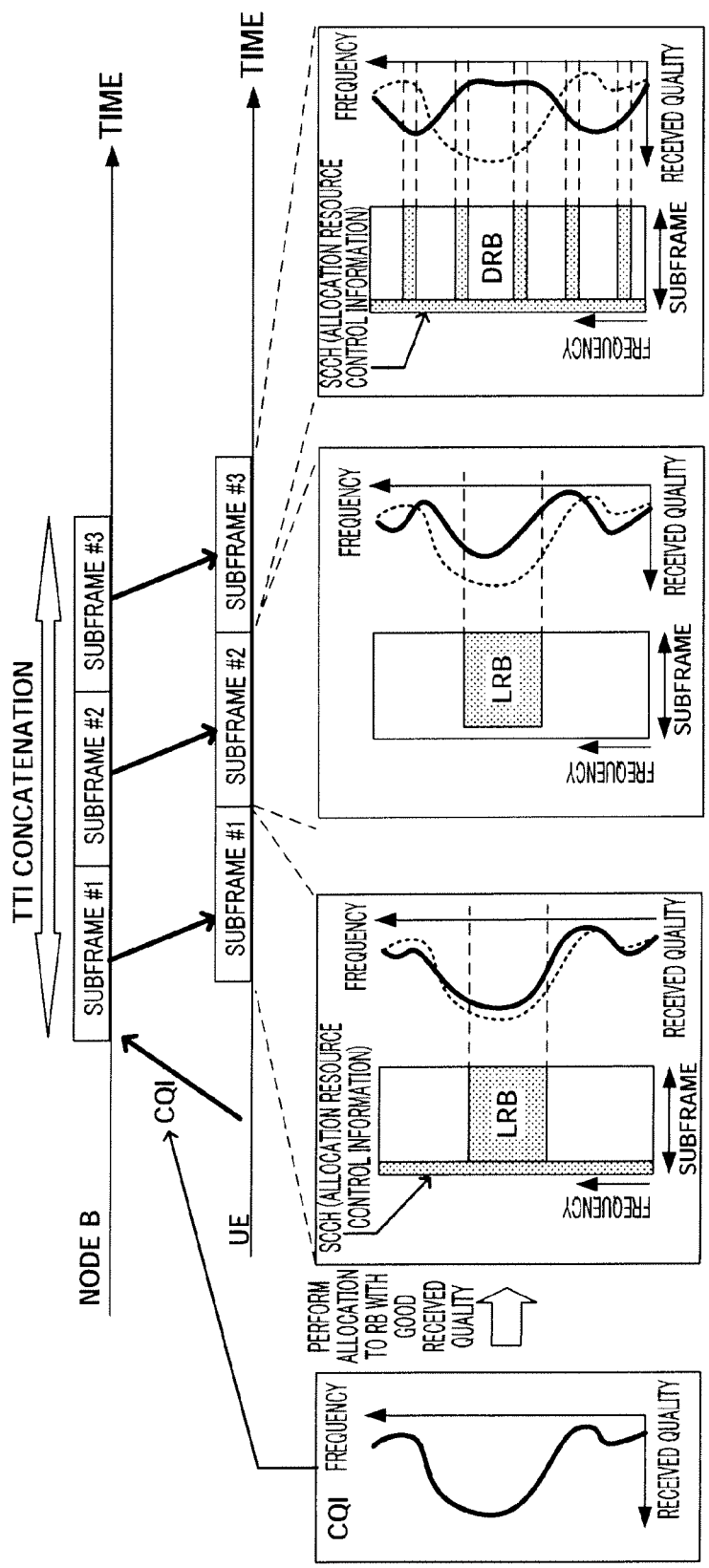
FIG. 11 illustrates reception processing and reception performance of the radio receiving apparatus according to Embodiment 2.

FIG. 11 illustrates reception processing and reception performance of the radio receiving apparatus according to the present embodiment. It is assumed that the LRB is selected as the resource allocation scheme and the number of reallocation subframes is "three."

Upon reception of subframe #1, first, by demodulating an SCCH arranged in the head of subframe #1, control data is obtained. The number of reallocation subframes, resource allocation scheme, LRB number and DRB number included in the control data is acquired and stored in an internal memory. Here, the resource allocation scheme is the LRB, and so data extracting section 159 extracts a data symbol from an allocation RB (RB to which data is actually mapped) based on the LRB number.

Upon reception of subframe #2, it can be determined that the number of reallocation subframes is "three" and subframe #2 is not yet a subframe to be subjected to reallocation, and therefore data extracting section 159 extracts a data symbol from the allocation RB based on the LRB number using the LRB scheme in the same way as subframe #1 as the resource allocation scheme at this time.

Upon reception of subframe #3, it can be determined that the number of reallocation subframes is "three" and subframe #3 is a timing (subframe) to be subjected to reallocation, and control information needs to be acquired again, and therefore data extracting section 159 demodulates the SCCH and obtains control data. When the resource allocation scheme included in the control data is still the LRB, data extracting section 159 extracts a data symbol from the allocation RB based on the same LRB number as that in the previous subframe. Further, when the resource allocation scheme included in the control data is changed to the DRB, data extracting section 159 identifies RB's on which the data symbol is multiplexed based on the DRB number and extracts the data symbol from these RB's.

In this way, the radio receiving apparatus according to the present embodiment can improve reception performance by receiving a signal transmitted from the radio transmitting apparatus according to the present embodiment and performing the above operations.

As described above, according to the present embodiment, the resource allocation scheme is fixed for a first predetermined period, and then switching of the resource allocation scheme is adaptively determined based on various conditions. Therefore, it is possible to reduce control information by TTI concatenation, and, when a frequency scheduling effect (received quality) by the LRB scheme upon transmission of the head subframe, degrades, the resource allocation scheme is switched to the DRB scheme appropriately by reallocation, so that it is possible to prevent degradation of received performances.

Figure 17:
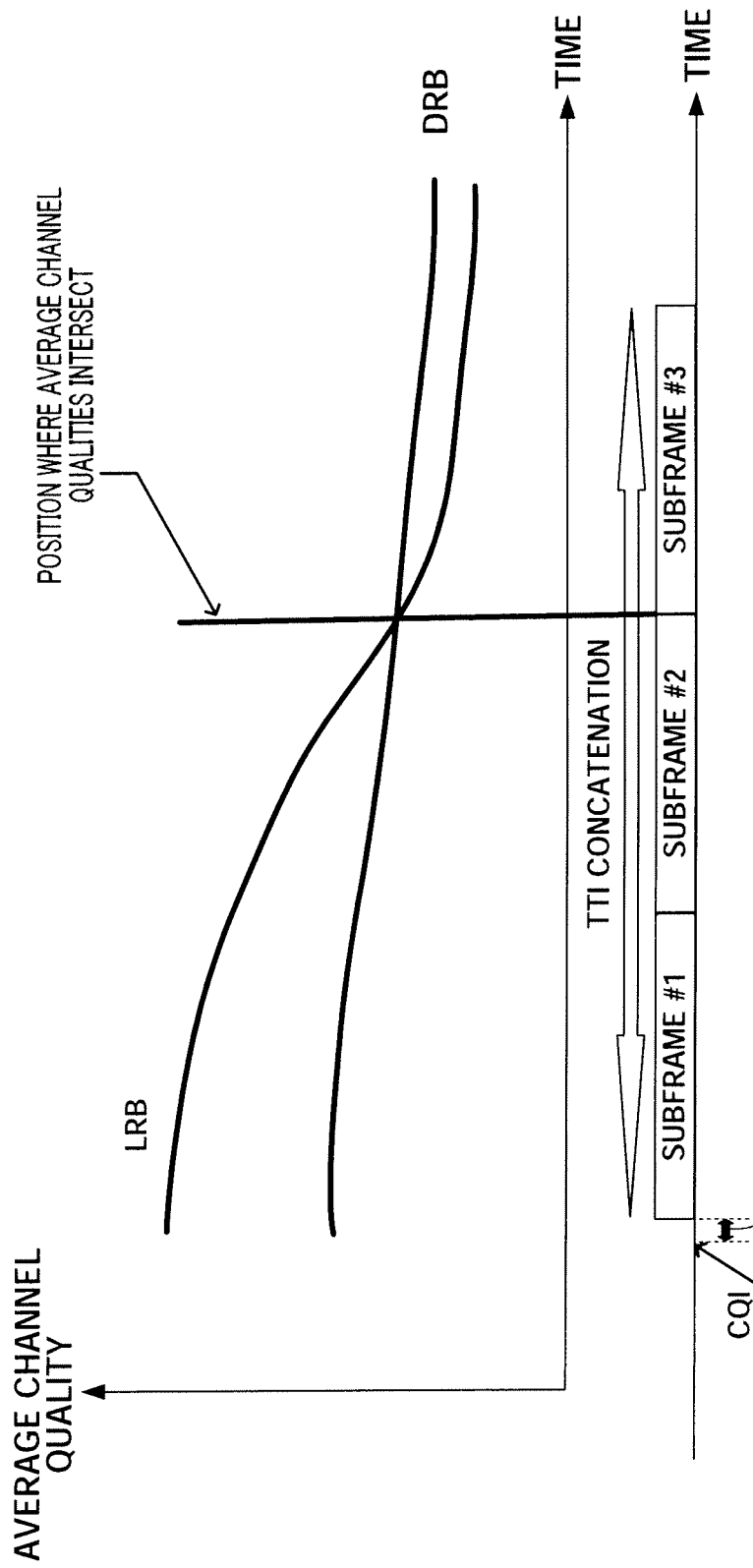
FIG. 17 shows that the average channel quality fluctuates depending on differences in CQI reception timings.
Figure 18:
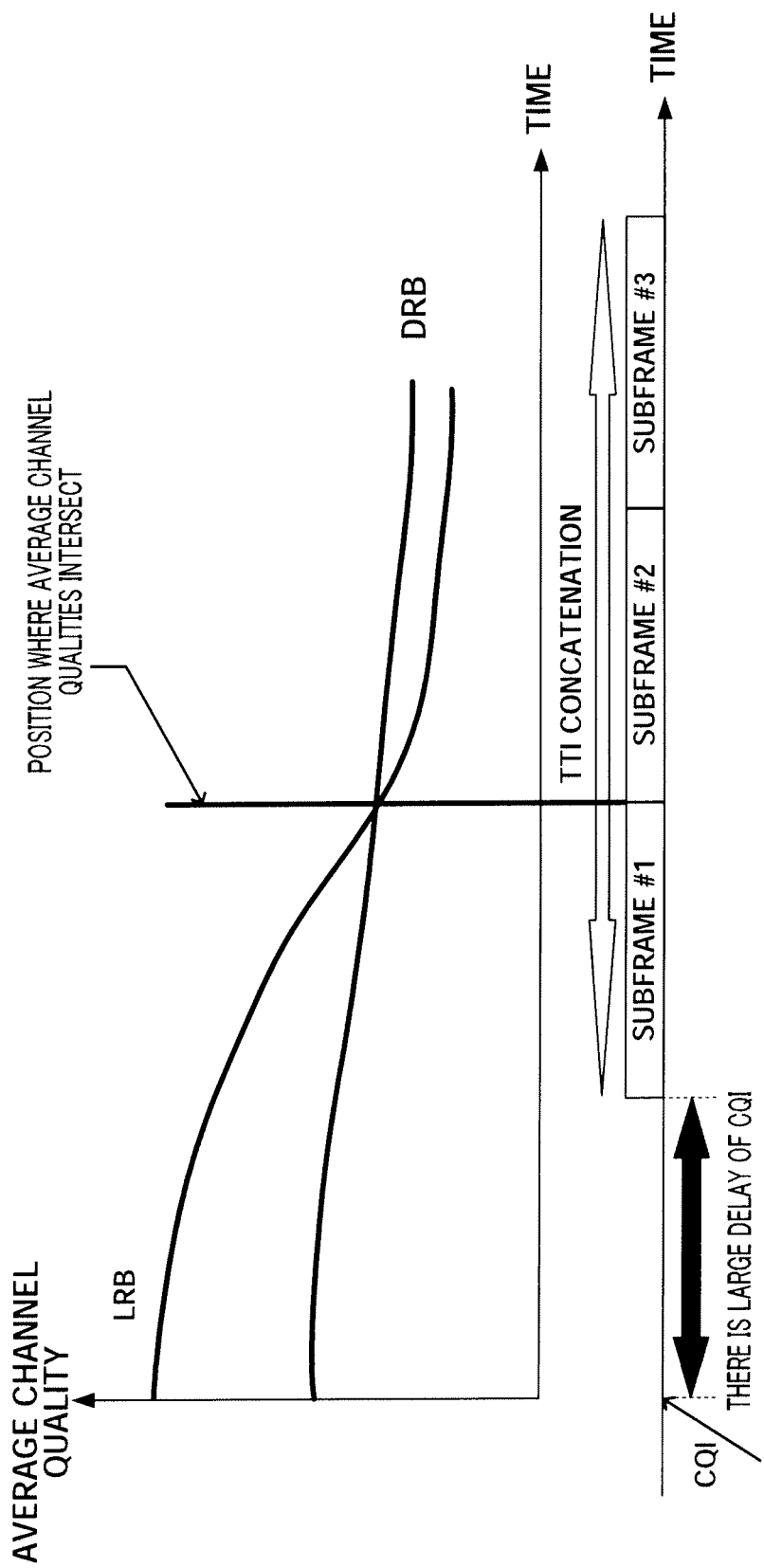
FIG. 18 shows that the average channel quality fluctuates depending on differences in CQI reception timings.

Further, although a configuration has been described as an example with the present embodiment where the reallocation start timing is determined based on only the moving speed of the mobile station, it is also possible to adopt a configuration where this reallocation start timing is determined based on the time interval from the CQI fed back from the mobile station, that is, based on the delay time from the CQI reception timing. Further, it is also possible to adopt a configuration where the reallocation start timing determined based on the moving speed of the mobile station is corrected based on the delay time from the CQI reception timing, because, when the delay time from the CQI reception timing is large, it is highly possible that average received quality fluctuates. FIG. 17 and FIG. 18 show that the average channel quality fluctuates depending on differences in the CQI reception timing. Here, a case is shown as an example where the mobile station moves at a medium speed. As shown in these figures, when the time interval from the CQI reception timing becomes larger, average channel quality degrades more substantially. Particularly, the performances of the LRB scheme degrade more significantly than that of the DRB scheme. Therefore, as a variation of the present embodiment, the time when the performance curve of the LRB scheme intersects with the performance curve of the DRB scheme (the position where the average channel qualities intersect), that is, the time when the performances of the LRB scheme and the DRB scheme switch, is set as the reallocation start timing. By this means, the reallocation start timing becomes optimum, so that it is possible to prevent degradation of reception performance. It is also possible to adopt a configuration where this control is performed based on BLER (outer loop control) in the mobile station, that is, ACK/NACK information transmitted from the mobile station to the base station.

Figure 19:
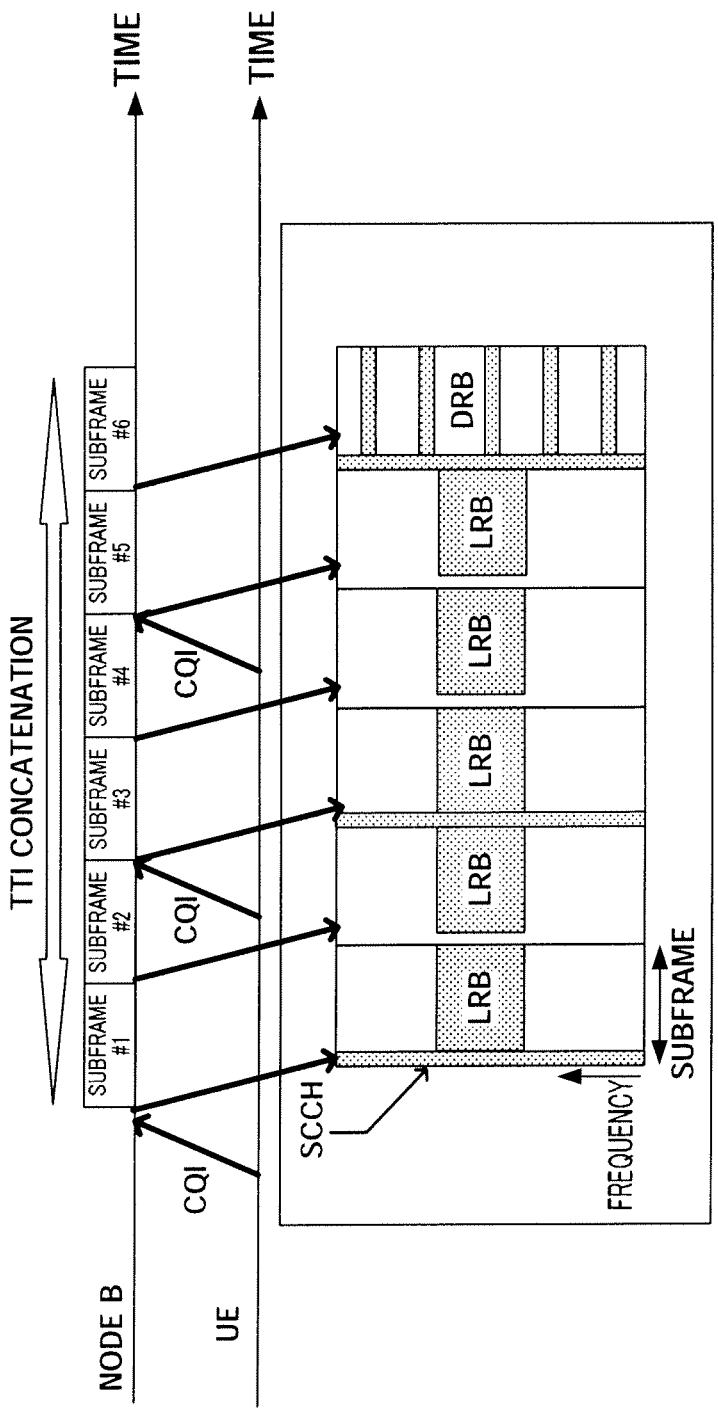
FIG. 19 shows a configuration of synchronizing a reallocation start timing with the CQI reception timing.

Further, with the present embodiment, it is also possible to adopt a configuration where the reallocation start timing is made in synchronization with the CQI reception timing so that reallocation is performed in accordance with the CQI reception timing fed back from the mobile station (see FIG. 19). Still further, it is also possible to adopt a configuration where the CQI is fed back in uplink in accordance with the reallocation start timing, that is, the CQI is fed back to the subframe to be subjected to reallocation.

The embodiments of the present invention have been described above.

The radio communication system, radio transmitting apparatus and resource allocation method according to the present invention are not limited by the above embodiments, and can be implemented with various modifications.

For example, a case has been assumed to explain with the present description where downlink communication from the base station to the mobile station is performed in the communication system of the OFDM scheme, the present invention is also applicable to uplink communication from the mobile station to the base station. In this case, as an uplink communication scheme, other than OFDM, communication schemes such as DFT-OFDM and SC-FDMA, which use the resource allocation schemes of the LRB scheme and DRB scheme, can be applied.

Further, with the present invention, it is also possible to adopt a configuration where the radio transmitting apparatus (base station) switches the resource allocation scheme or performs reallocation after receiving a request for switching the resource allocation scheme or a request for reallocating frequency resources from the radio receiving apparatus (mobile station). That is, it is also possible to adopt a configuration where, only when the received quality of the allocated band degrades and the resource allocation scheme needs to be switched from the LRB to the DRB, the mobile station requests the base station to, for example, switch the scheme using uplink. By this means, the mobile station can take the initiative of, for example, switching the resource allocation scheme, so that, even when the channel fluctuates significantly, it is possible to follow the fluctuations easily. As the request signal (flag), a CQI feedback signal from the mobile station may be substituted. That is, it is also possible to adopt a configuration where, when the CQI is fed back from the mobile station, the base station decides that there is a request for, for example, switching the resource allocation scheme, and performs switching. By this means, it is possible to request, for example, switching without transmitting new control information separately. Further, the CQI only needs to include at least average received quality information of the entire band for the DRB.

Figure 20:
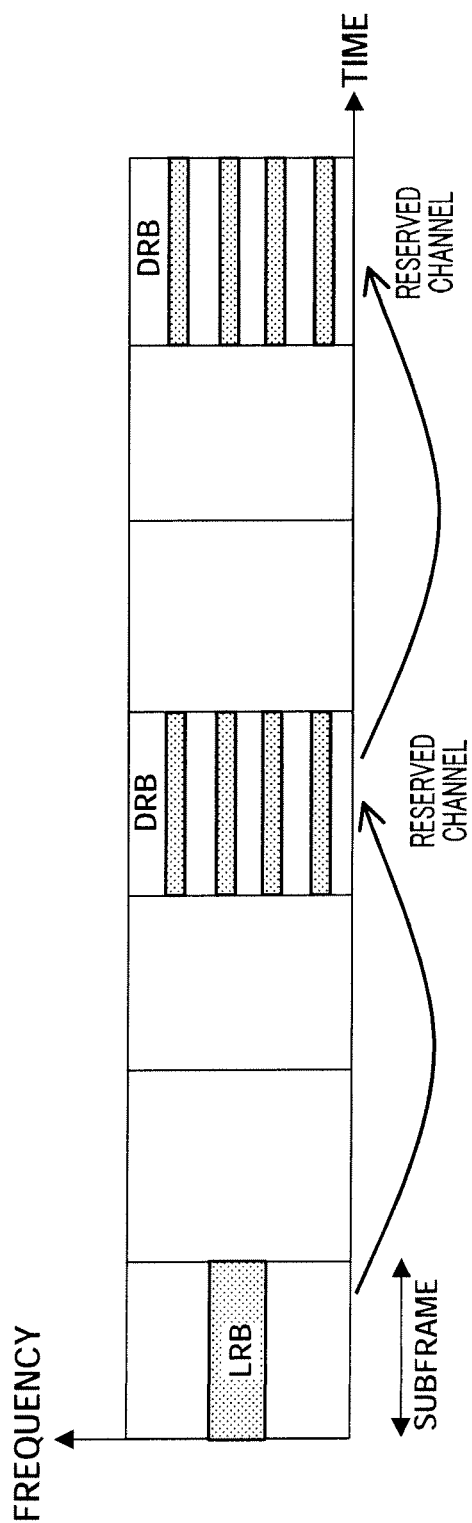
FIG. 20 shows a reserved channel to which adjacent subframes are not connected.

Still further, although attention is focused on TTI concatenation with the present description, the present invention is not limited to this and is applicable to channels such as a reserved channel (see FIG. 20) to which adjacent subframes are not connected.

Further, although with the present description, control information is reported using the SCCH, a control channel with other names such as a dedicated control channel may be used.

Further, the resource allocation schemes for all the subframes need not be specified in the head subframe, but the resource allocation scheme may be specified per subframe.

Still further, it is also possible to use as average channel quality, the amount of a shift between the feedback CQI and actual SINR, the amount of degradation of reception performances and the amount of margin with respect to the required received quality, that are caused by channel fluctuation.

Further, the LRB is a channel for performing frequency scheduling transmission and also referred to as a localized channel. On the other hand, the DRB is a channel for performing frequency diversity transmission and also referred to as a distributed channel.

Further, the LRB is normally allocated in subband units or in units of a plurality of consecutive subcarriers. On the other hand, the DRB is configured with a plurality of subcarriers distributed over a wide band of the OFDM symbol, or defined by the FH (Frequency Hopping) pattern. Further, the DRB may also be referred to as "Intra-TTI frequency hopping." Still further, the DRB may be realized by frequency interleaving.

Further, TTI concatenation may be referred to as "longer TTI," "variable TTI" and "adaptive TTI."

Further, the radio transmitting apparatus according to the present invention can be mounted on a communication terminal apparatus and base station apparatus in a mobile communication system, so that it is possible to provide a communication terminal apparatus, base station apparatus and mobile communication system that have the same operational effects as described above.

Here, a case where the present invention is implemented by hardware has been explained as an example, but the present invention can also be implemented by software. For example, the functions similar to those of the radio transmitting apparatus according to the present invention can be realized by describing an algorithm of the resource reallocation method according to the present invention in a programming language, storing this program in a memory and causing an information processing section to execute the program.

Each function block used to explain the above-described embodiments may be typically implemented as an LSI constituted by an integrated circuit. These may be individual chips or may partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology.

Application of biotechnology is also possible.

The disclosure of Japanese Patent Application No. 2006-076610, filed on Mar. 20, 2006, including the specification, drawings and abstract, is incorporated herein by reference in its entirety.

INDUSTRIAL APPLICABILITY

The radio transmitting apparatus and resource allocation method according to the present invention are applicable to, for example, a communication terminal apparatus and base station apparatus in a mobile communication system.

The invention claimed is:

1. A radio transmitting apparatus in which a connection subframe connecting a plurality of subframes is used as one unit in transmission processing, the radio transmitting apparatus comprising:
   a selecting section that selects, per sub frame, a localized resource block scheme or a distributed resource block scheme as a resource allocation scheme; and
   an allocating section that allocates data in the connection subframe to frequency resources per subframe according to the selected resource allocation scheme; and
   a reporting section that reports, to a radio receiving apparatus, control information indicating a timing for switching the resource allocation scheme from the localized resource block scheme to the distributed resource block scheme,
   wherein the selecting section switches the resource allocation scheme from the localized resource block scheme to the distributed resource block scheme in the connection subframe, and determines a timing for switching the resource allocation scheme from the localized resource block scheme to the distributed resource block scheme based on a delay time from a timing of receiving a channel quality indicator from the radio receiving apparatus or based on a moving speed of the radio receiving apparatus.

2. The radio transmitting apparatus according to claim 1, wherein when the resource allocation scheme is the distributed resource block scheme, the allocating section distributes the frequency resources in a greater range in later subframes.

3. The radio transmitting apparatus according to claim 1, wherein when the resource allocation scheme is the distributed resource block scheme, the allocating section makes the frequency resources to which the data is allocated different between subframes.

4. The radio transmitting apparatus according to claim 1, further comprising:
   a table that is common between the radio transmitting apparatus and the radio receiving apparatus and that stores a plurality of resource allocation methods of the localized resource block scheme and a plurality of resource allocation methods of the distributed resource block scheme, in association with each other one-on-one, wherein
   said reporting section reports, to the radio receiving apparatus, the control information indicating a resource allocation method out of the plurality of resource allocation methods of the localized resource block scheme.

5. The radio transmitting apparatus according to claim 1, wherein when switching is requested from the radio receiving apparatus, the selecting section switches the resource allocation scheme from the localized resource block scheme to the distributed resource block scheme.

6. The radio transmitting apparatus according to claim 5, wherein when a channel quality indicator is fed back from the radio receiving apparatus at a predetermined timing, the selecting section determines that the switching is requested.

7. A communication terminal apparatus comprising the radio transmitting apparatus according to claim 1.

8. A base station apparatus comprising the radio transmitting apparatus according to claim 1.

9. A resource allocation method using a connection subframe connecting a plurality of subframes as one unit in communication processing, the method comprising:
   selecting, per subframe, a localized resource block scheme or a distributed resource block scheme as a resource allocation scheme; and allocating data in the connection subframe to frequency resources per subframe according to the selected resource allocation scheme, wherein a resource allocation scheme is switched from a localized resource block scheme to a distributed resource block scheme in the connection subframe, control information indicating a timing for switching the resource allocation scheme from the localized resource block scheme to the distributed resource block scheme is reported to a radio receiving apparatus, and a timing for switching the resource allocation scheme from the localized resource block scheme to the distributed resource block scheme is determined based on a delay time from a timing of receiving a channel quality indicator from the radio receiving apparatus or based on a moving speed of the radio receiving apparatus.

* * * * *